United States Patent
Park

(10) Patent No.: US 7,305,460 B2
(45) Date of Patent: Dec. 4, 2007

(54) INITIALIZATION FILE DOWNLOADING APPARATUS AND METHOD OF CABLE MODEM

(75) Inventor: Min Young Park, Sungnam (KR)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 09/991,409

(22) Filed: Nov. 16, 2001

(65) Prior Publication Data

US 2002/0052927 A1     May 2, 2002

(30) Foreign Application Priority Data

Nov. 20, 2000     (KR) ............................... 2000-69028

(51) Int. Cl.
- G06F 15/177 (2006.01)
- G06F 15/173 (2006.01)
- G06F 15/16 (2006.01)

(52) U.S. Cl. .................. 709/222; 709/225; 709/226

(58) Field of Classification Search .......... 709/217, 709/222, 225, 226, 227, 229; 717/170
See application file for complete search history.

(56) References Cited

U.S. PATENT DOCUMENTS

| | | | | |
|---|---|---|---|---|
| 5,473,610 A * | 12/1995 | Rainard | ................. | 370/395.62 |
| 5,819,042 A * | 10/1998 | Hansen | .................. | 709/222 |
| 5,845,077 A * | 12/1998 | Fawcett | .................. | 709/221 |
| 6,012,088 A * | 1/2000 | Li et al. | .................. | 709/219 |
| 6,049,826 A * | 4/2000 | Beser | .................. | 709/222 |
| 6,212,563 B1 * | 4/2001 | Beser | .................. | 709/227 |
| 6,236,678 B1 * | 5/2001 | Horton et al. | .................. | 375/222 |
| 6,289,377 B1 * | 9/2001 | Lalwaney et al. | .................. | 709/222 |
| 6,347,398 B1 * | 2/2002 | Parthasarathy et al. | .................. | 717/178 |
| 6,532,495 B1 * | 3/2003 | Welles et al. | .................. | 709/232 |
| 6,549,584 B1 * | 4/2003 | Gatherer et al. | .................. | 375/261 |
| 6,553,040 B2 * | 4/2003 | Bernath et al. | .................. | 370/509 |
| 6,574,796 B1 * | 6/2003 | Roeck et al. | .................. | 725/111 |
| 6,606,352 B2 * | 8/2003 | Horton et al. | .................. | 375/222 |
| 6,657,991 B1 * | 12/2003 | Akgun et al. | .................. | 375/222 |
| 6,694,367 B1 * | 2/2004 | Miesbauer et al. | .................. | 709/227 |
| 6,715,075 B1 * | 3/2004 | Loukianov | .................. | 713/176 |

(Continued)

FOREIGN PATENT DOCUMENTS

WO     WO 02/48897 A1 *     6/2002

(Continued)

Primary Examiner—Jason Cardone
Assistant Examiner—Brian J Gillis
(74) Attorney, Agent, or Firm—Lee, Hong, Degerman, Kang & Schmadeka

(57) ABSTRACT

An initialization file download method of a cable modem includes the steps of: registering configuration file name information in a DHCP server; receiving the configuration file name information registered in the DHCP server; comparing the received first configuration file name information with a previously stored second configuration file name information; downloading the received first configuration file name information, if the received first configuration file name/version is more updated file than the second configuration file name/version upon comparison; updating the memory with the downloaded first configuration file name information; and registering a cable modem by using the received first configuration file name information. Since the configuration file for initializing the cable modem is downloaded, there is no need to download the configuration file in the initializing process, so that the time required for initializing process can be shortened at the maximum.

10 Claims, 6 Drawing Sheets

U.S. PATENT DOCUMENTS

| | | | |
|---|---|---|---|
| 6,742,187 B1 * | 5/2004 | Vogel | 725/126 |
| 6,775,276 B1 * | 8/2004 | Beser | 370/389 |
| 2001/0053193 A1 * | 12/2001 | Mitra et al. | 375/356 |
| 2002/0062485 A1 * | 5/2002 | Okano et al. | 725/111 |
| 2002/0083466 A1 * | 6/2002 | Ina | 725/121 |
| 2003/0066088 A1 * | 4/2003 | Jung | 725/111 |

FOREIGN PATENT DOCUMENTS

WO    WO0248897 A1 *  6/2002

* cited by examiner

INITIALIZATION FILE DOWNLOADING APPARATUS AND METHOD OF CABLE MODEM

CROSS-REFERENCE TO RELATED APPLICATIONS

Pursuant to 35 U.S.C. § 119(a), this application claims the benefit of earlier filing date and right of priority to the Korean Application No. 200069028, filed on Nov. 20, 2000, the content of which is hereby incorporated by reference herein in its entirety.

BACKGROUND OF THE INVENTION

1. Field of the Invention

The present invention relates to a file downloading apparatus and method of a cable modem that is capable of shortening the time required for initializing a cable modem by downloading a file for initializing the cable modem.

2. Description of the Background Art

Recently, as the number of high-speed ethernet users increase, in order to provide a data communication service at a high speed, which has been provided by using a telephone network, a cable modem for relaying a data communication by using a coaxial cable installed at each home has been proposed.

The cable modem is a device for transmitting and receiving various data such as an Internet data at a high speed by using a cable TV network, which connects a user personal computer and the cable TV network.

Though an international standard for the cable modem has not been set yet, there are multimedia cable network standard (MCNS)/data over cable service interface specification (DOCSIS) modem which is widely adopted for use in Korea and the North America and a DAVIC modem which is widely used in Europe, and an IEEE modem.

Generally, a DOCSIS-authenticated cable modem has advantages that it is capable of transmitting a data at the high speed of the maximum 41 Mbps/sec. for downloading and the maximum 3 Mbps/sec in uploading (on the basis of DOCSIS 1.0) compared to the case of transmitting a data through the telephone line, and there is no charge for occupation of the telephone line even though the power is kept turning on.

The network using the cable modem will now be described in detail with reference to FIG. 1.

FIG. 1 is a drawing illustrating a network using a general cable modem, which includes a wideband communication network 10 having a plurality of servers to transmit a data to a user; a cable modem termination system (CMTS) connected to the wideband communication network 10, for transmitting and receiving a data; a cable modem (CM) 40 for receiving a data signal from the cable modem termination system 20 and transmitting it to an instrument such as a CRT 50 which can be viewed by a user; and a cable modem network manager 30 for managing data transmission and reception between the cable modem 40 and the cable modem termination system 20.

The cable modem termination system 20 includes a propagation relay (headend) unit for receiving an upstream signal transmitted from the cable modem 40 of each home and transmitting a downstream signal to the cable modem 40 of each home.

When the downstream signal is transmitted from the dable modem termination system 20, an media access control management message, a cable media control signal commonly used for several cable modems 40, is also transmitted by being included in the downstream signal, so that the cable modem 40 determines an operation method for receiving and initializing the MAC management message.

The method in which the cable modem 40 receives the downstream signal from the cable modem termination system 20 and selects an upstream channel will now be described with reference to FIG. 2.

FIG. 2 is a flow chart of a method for initializing the cable modem in accordance with the conventional art.

First, the cable modem 40 detects a downstream channel through which it can transmit and receive a data to and from the cable modem termination system 20 (step S1).

The synchronization message for synchronizing the cable modem 40 and the cable modem termination system is first received among the MAC management message transmitted from the cable modem termination system 20 through the detected downstream channel (step S2).

If the cable modem 40 and the cable modem termination system 20 are synchronized according to the synchronization message, the cable modem 40 receives an upstream channel descriptor (UCD) message having inforation related to the upstream channel from the cable modem termination system 20 through the downstream channel (step S3).

The UCD message provides information related to the upstream channel according to a plurality of servers, so that the cable modem 30 receiving one downstream can use the servers 11, 12 and 13 of the wideband communication network 10.

The cable modem 40 receives every UCD message which can be received from the selected downstream channel, selects an arbitrary one upstream channel among the received UCD message (S4), and performs a ranging process for the selected upstream channel (step S15).

The ranging is to exchange a data such as a power level and a timing synchronization between the cable modem 40 and the cable modem termination system 20 for a proper data transmission.

When the ranging process is successfully completed, the cable modem 40 receives various configuration information to be used by the cable modem 40 from the external dynamic host configuration protocol (DHCP) server 11 through the cable modem termination system 20, by using the DHCP (step S6).

The data received from the DHCP server 11 can be described in detail with reference to FIG. 3.

FIG. 3 is a drawing illustrating a format constructed by an encoding method of a general DHCP.

The data received from the DHCP server 11 includes an IP address to be used by the cable modem, an IP address of a trivial file transfer protocol (TFTP) server, an IP address of a time of day (TOD) server, and a configuration file name.

The cable modem 40 detects an IP address to be used and time and data information transmitted from the TOD server 13 by using the data received from the DHCP server (step S7), and downloads a configuration file having defined parameter values in which a data transmission/reception method with respect to the cable modem termination system 20 is defined (step S8).

The cable modem 40 performs a registration process using the downloaded configuration file. By performing the registration process, the user personal computer can transmit various information such as the Internet data to a different network and receive various information data from an external network (step S9).

In order to perform the registration process, the conventional cable modem 40 should first perform the process for downloading the configuration file every time before transmitting or receiving a data, and then, the normal operation of the cable modem can be guaranteed.

However, in the substantial cable modem network, the same configuration file is used for every cable modem domain. The change period of the configuration file is set long, and only in case that the cable modem network situation is changed, the configuration file is changed.

Accordingly, it is ineffective to download the configuration file every time when the cable modem is initialized, and since the time required for initializing the cable modem is lengthened, a delay occurs in accessing the communication network.

SUMMARY OF THE INVENTION

Therefore, an object of the present invention is to provide a file download apparatus and method of a cable modem that are capable of shortening the time required for initialization by downloading a configuration file for initializing a cable modem and storing it in a non-volatile memory, without a necessity of downloading a configuration file in initializing the cable modem.

To achieve these and other advantages and in accordance with the purpose of the present invention, as embodied and broadly described herein, there is provided an initialization file download apparatus of a cable modem including: a tuner unit for tuning a plurality of downstream signals and upstream signals being transmitted and received and outputting them; a downstream unit for demodulating the downstream signal inputted from the tuner unit and separating a general data and an MAC management message; a message processor for detecting configuration file name information and MAP information according to the MAC management message inputted from the downstream unit; a non-volatile memory for storing the configuration file name information detected from the message processor; a CPU for controlling the message processor; and an upstream unit for generating/modulating the upstream signal according to the MAP information detected from the message processor.

In the present invention, a configuration file, that is, an initialization file downloaded to the apparatus for downloading the initialization file of a cable modem, includes a fine name unit for indicating a configuration file name; a configuration file version unit for indicating configuration file version information; and delimiter unit for differentiating the configuration file name unit and the configuration file version unit.

To achieve the above objects, there is also provided an initialization file download method of a cable modem including the steps of: registering configuration file name information in a DHCP server; receiving first configuration file name information registered in the DHCP server; comparing the received first configuration file name information with a previously stored second configuration file name information; downloading the received first configuration file name information, if the received first configuration file name/version is more updated file than the second configuration file name/version upon comparison; updating the memory with the downloaded first configuration file name information; and registering a cable modem by using the received first configuration file name information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
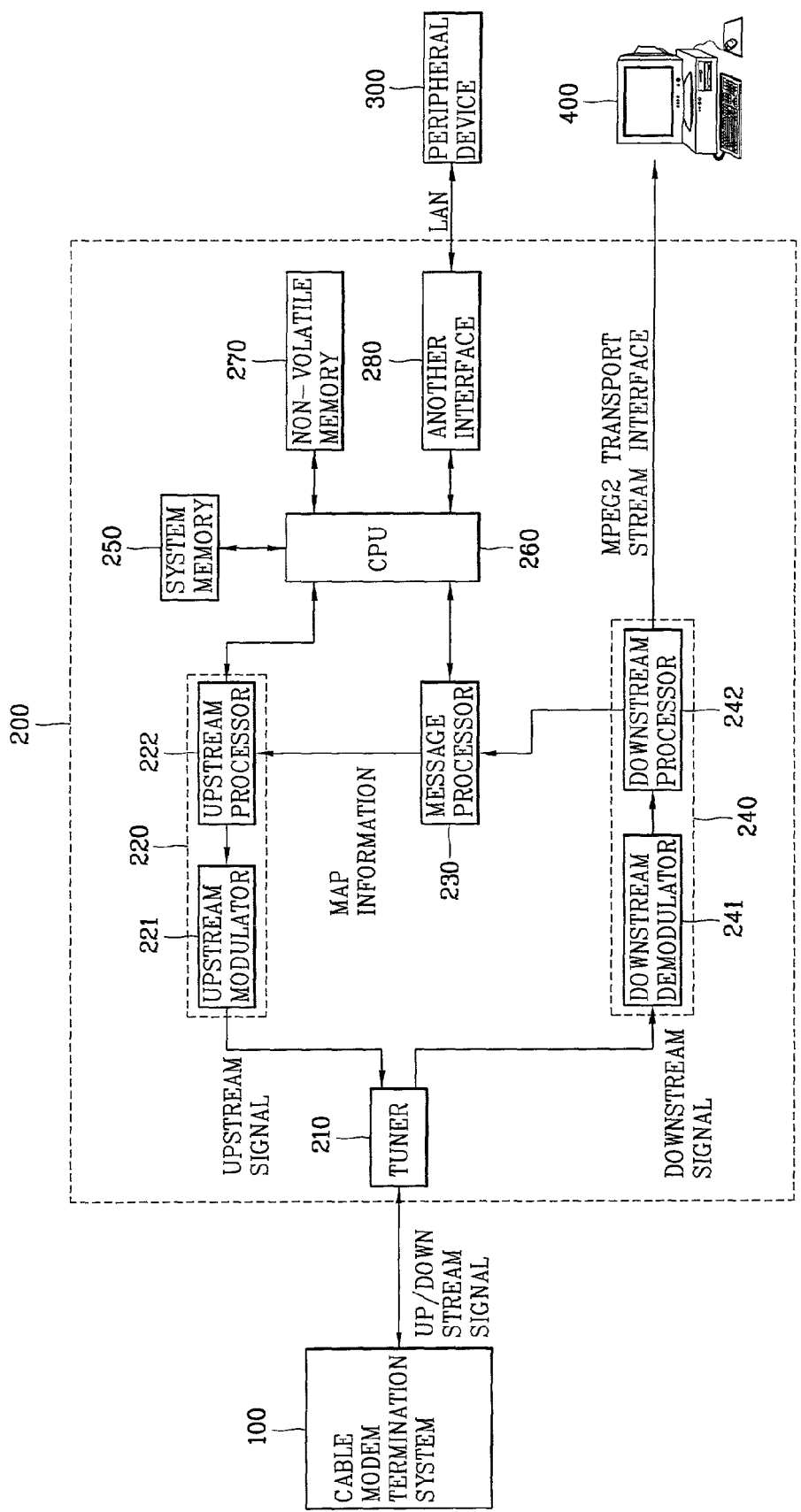
FIG. 4 is a drawing illustrating a configuration file downloading apparatus in accordance with a preferred embodiment of the present invention.

FIG. 4 is a drawing illustrating a configuration file downloading apparatus in accordance with a preferred embodiment of the present invention.

As shown in FIG. 4, the configuration file downloading apparatus includes: a tuner 210 for tuning a plurality of downstream signals received from a cable modem termination system (CMTS) 100 to output them, and tuning inputted upstream signals to transmit them to the cable modem termination system 100; a downstream unit 240 for demodulating the downstream signals inputted from the tuner unit 210, separating a general data and an media access control (MAC) management message, and transmitting the general data signal to a CRT 400 that can be viewed by a user through an MPEG 2 transport stream interface; a message processor 230 for receiving the MAC management message separated by the downstream unit 240 and detecting the configuration file and manufacturing automation protocol (MAP) information; a non-volatile memory 270 for storing the configuration file detected from the message processor 230; a system memory 250 for storing an IP address and time/date information detected from the message processor 230; a CPU 260 for controlling the message processor 230 and comparing the configuration file stored in the non-volatile memory and the received configuration file to select one of them; an interface 280 for transmitting a data processed by the message processor 230 to a peripheral device 300 by using the ethernet or a connector; and an upstream unit 220 for generating and modulating an upstream signal by using the MAP information detected from the message processor 230 and outputting it to the tuner unit 210.

The downstream unit 240 includes a downstream demodulator 241 for demodulating the downstream signal inputted from the tuner unit 210 and outputting it; and a downstream processor 242 for separating the signal demodulated by the downstream demodulator 241 into a general data and an AMC processing data, and transmitting the general data through the MPEG2 transport stream interface to a display unit 400 and outputting the MAC processing data to the message processor 230.

The upstream unit 220 includes an upstream processor 222 for processing a data which has not been transmitted to a host according to the MAP information inputted from the message processor 230, and generating an upstream data; and an upstream modulator 221 for modulating the upstream signal generated by the upstream processor 222 and outputting it to the tuner unit 210.

The configuration file stored in the non-volatile memory 270 is a file for initializing the cable modem 200, and the message processor 230 stores the detected configuration file in the non-volatile memory 270 only in case that the detected configuration file is more lately updated one than the configuration file stored in the non-volatile memory 270.

In order to compare the stored configuration file and the detected configuration file, the configuration file and the version information of the configuration file are encoded together to the format of a boot file name region 60 within the existing DHCP message format.

Figure 1:
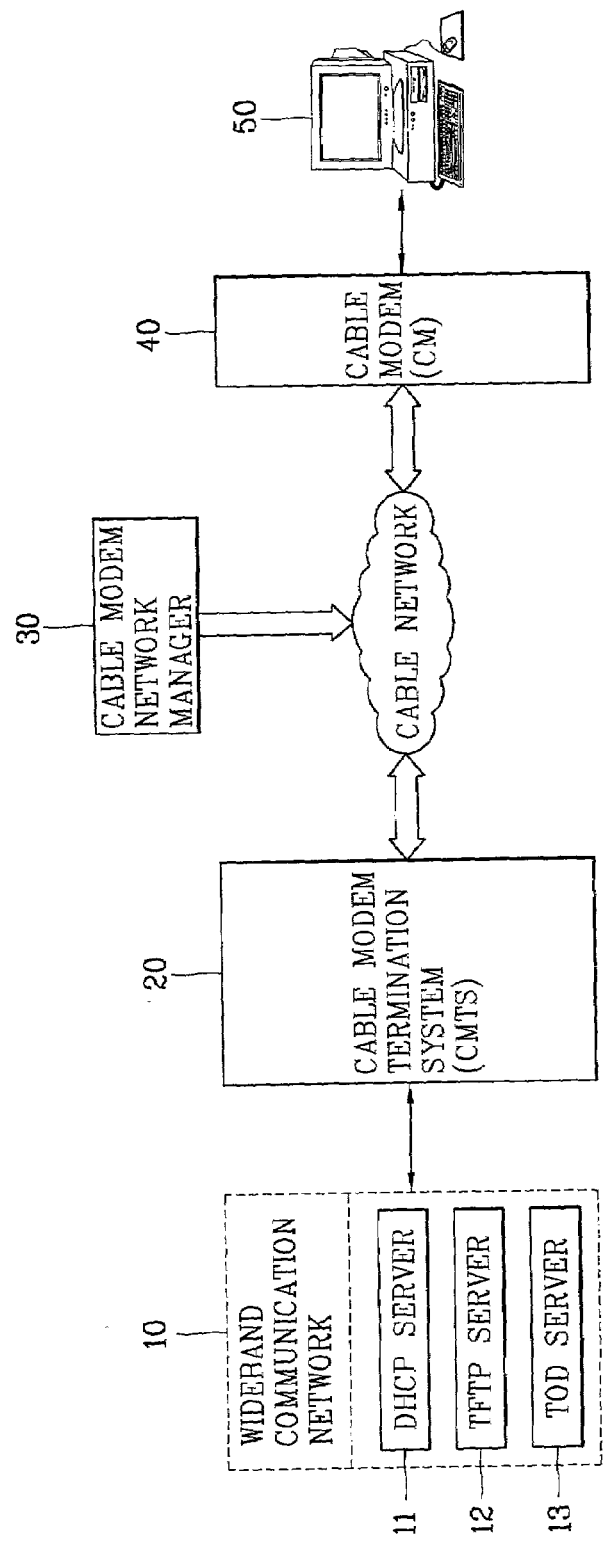
FIG. 1 is a drawing illustrating a network construction using a general cable modem.
Figure 2:
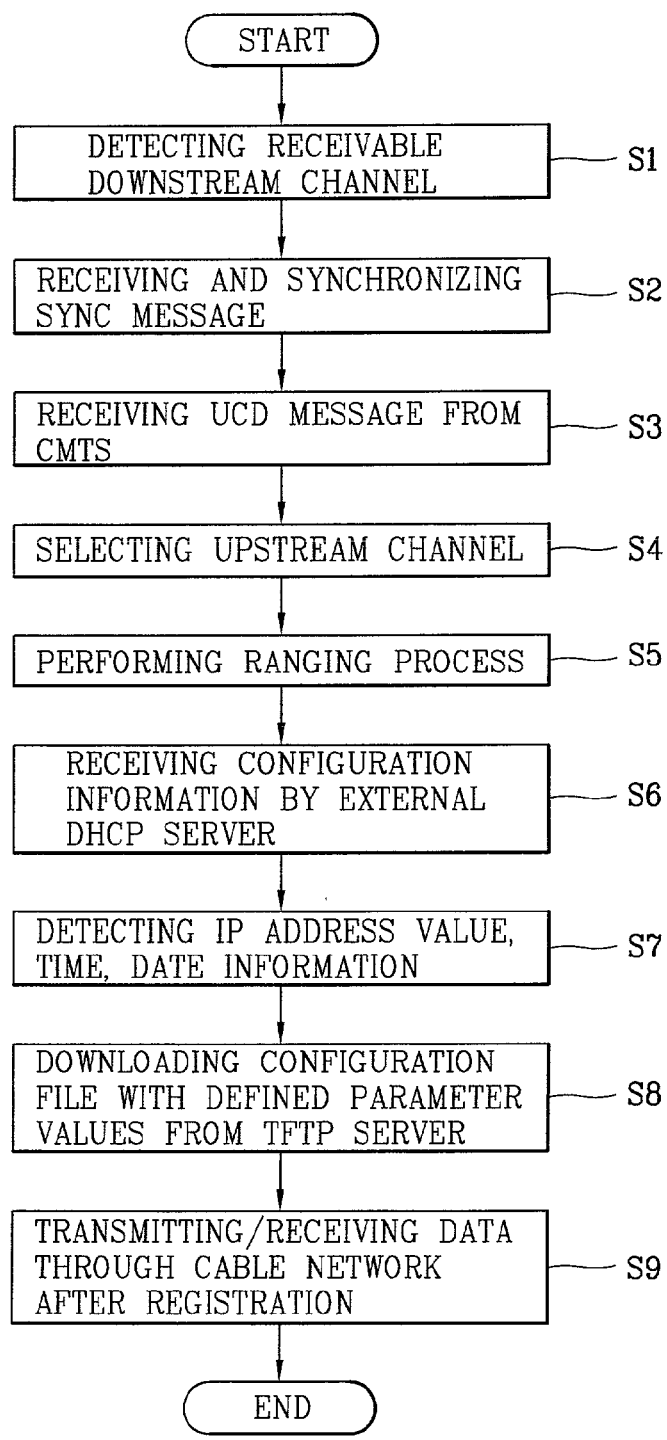
FIG. 2 is a flow chart of a method for initializing the cable modem in accordance with a conventional art.
Figure 3:
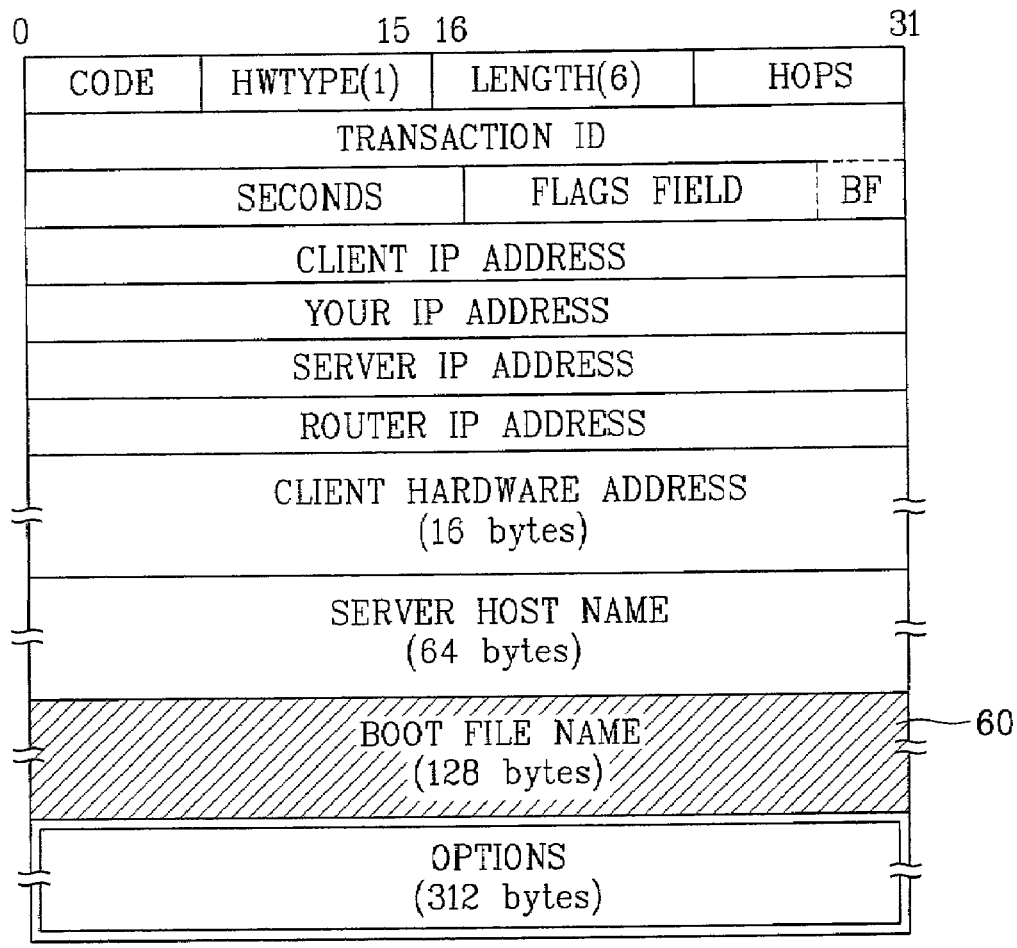
FIG. 3 is a drawing illustrating a format constructed according to an encoding method of a general DHCP.

This will now be described in detail with reference to FIGS. 3 and 6.

Figure 6A:
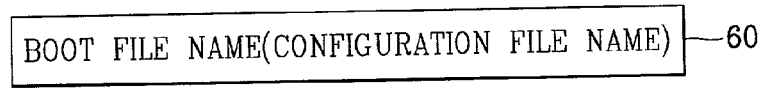
FIGS. 6A and 6B are drawings comparatively illustrating a configuration file name format in accordance with the preferred embodiment of the present invention and the conventional configuration file name format.
Figure 6B:
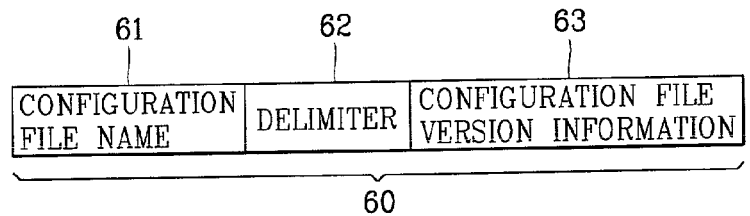

FIGS. 6A and 6B are drawings comparatively illustrating a configuration file name format in accordance with the preferred embodiment of the present invention and the conventional configuration file name format, of which FIG. 6A shows a configuration file of a boot file name region 60 of a conventional DHCP message format (refer to FIG. 3), and FIG. 6B shows a construction of the configuration file name information of a boot file name region 60 in accordance with the present invention.

As shown in Figure and 6B, the configuration file name information includes a configuration file name part 61 for indicating a configuration file name; a configuration file version information part 63 for indicating a configuration file version information; and a delimiter 62 for differentiating the configuration file name part 61 and the configuration file version information part 63.

By encoding the configuration file version information to the format of the boot file name region 60, the cable modem can be aware of the configuration file version information existing in the current TFTP even without downloading the configuration file.

The version information of the configuration file version information part 63 may be displayed in various types such as a time value defined in an RFC868, a time protocol, or a string type of the number information.

The format of the configuration file information will now be described in detail with reference to FIG. 7.

Figure 7A:
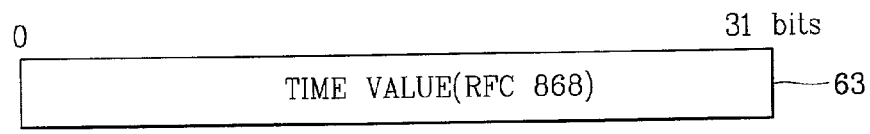
FIGS. 7A and 7B are drawings illustrating formats of configuration file version information in accordance with the preferred embodiment of the present invention.
Figure 7B:
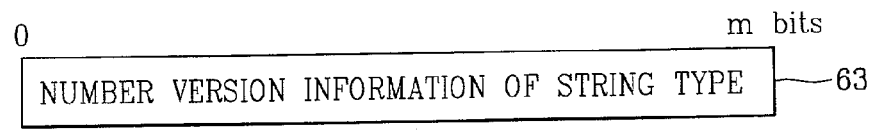

FIGS. 7A and 7B are drawings illustrating formats of configuration file version information in accordance with the preferred embodiment of the present invention.

As shown in FIG. 7A, the configuration file version information may be displayed by using a time value defined in the RFC868, the time protocol, or as shown in FIG. 7B, the configuration file version information may be displayed by constructing it in a string format of the number information.

As state above, by re-constructing the boot file name region 60 of the DHCP message format, the conventionally used DHCP message form can be used as it is.

The operation of the configuration file downloading apparatus constructed as described above will now be explained with reference to FIG. 5.

Figure 5:
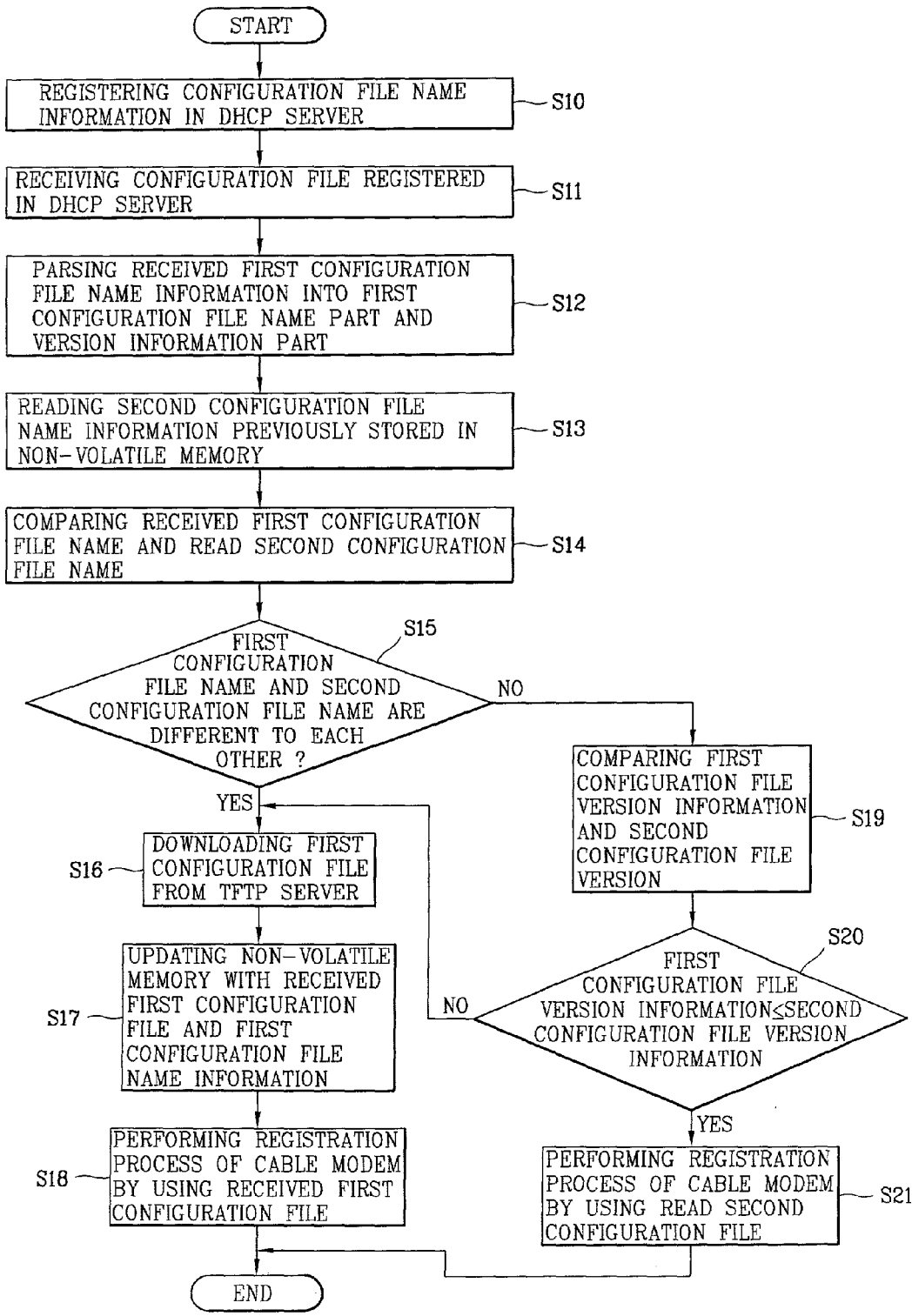
FIG. 5 is a flow chart of a method for downloading the configuration file in accordance with the preferred embodiment of the present invention.

FIG. 5 is a flow chart of a method for downloading the configuration file in accordance with the preferred embodiment of the present invention.

As shown in FIG. 5, first, a manager managing the cable modem network constructs the configuration file name to be used by a pertinent cable group, to have a file name part, a file version information part and a delimiter part and registers it in the DHCP server (step S10).

The cable modem 200 detects a downstream channel through which it can transmit and receive a data to and from the cable modem termination system 100, and receives a synchronization message for synchronizing the cable modem 200 and the cable modem terminal system 100 among the MAC management message transmitted through the detected downstream channel from the cable modem termination system 100.

According to the received synchronization message, if the cable modem 200 and the cable modem termination system 100 are synchronized, the cable modem 100 receives an upstream channel descriptor (UCD) message having information related to the upstream channels of the plurality of servers from the cable modem termination system 100 through the downstream channel.

After receiving every UCD message as can be received from the selected downstream channel, the cable modem 100 selects one upstream channel among the received UCD message and performs a ranging process for the selected upstream channel.

The ranging process is to exchange a data such as a power level and a timing synchronization between the cable modem 40 and the cable modem termination system 20 for a proper data transmission.

When the ranging process is successfully completed, the cable modem 200 receives various configuration file name information together with other information from the external dynamic host configuration protocol (DHCP) server 11 through the cable modem termination system 20, by using the DHCP (step S11).

The received configuration file name information is parsed into a configuration file name (CfgFilename) part and a configuration file version information (CfgVersionInformation) part which border the delimiter therebetween in the message processor 230 (step S12).

When the parsing is completely performed, the CPU 260 reads the second configuration file name of the second configuration file name information which it has downloaded in the previous initializing process and the second configuration file version information from the non-volatile memory (NVM) 270 (step S13).

The CPU 260 compares the file name of the configuration file name information parsed from the message processor 230 and the second configuration file name read from the non-volatile memory 270 (step S14).

Upon comparison, if the received configuration file name is different from the file names stored in the non-volatile memory 270 (step S15), it is determined that there is a new configuration file and the received configuration file is downloaded from the TFTP server (step S16), and then the non-volatile memory 270 is updated with the new downloaded configuration file name and the configuration file version information.

The message processor 230 outputs the MAP information according to the updated configuration file to the upstream unit 220, and then, the upstream unit 220 generates/modulates the upstream signal according to the inputted MAP information, transmits it to the cable modem termination system 100, thereby performing the registration process of the cable modem (step S18).

Upon comparison, if, however, the received configuration file is identical to the file name stored in the non-volatile memory 270, the received configuration file version information and the second configuration file version information stored in the non-volatile memory 270 are compared (step S19).

Upon comparison, if the received first configuration file version information is a later verison than the second configuration file version information stored in the non-volatile memory, the received configuration file name and the configuration file version information are downloaded from the TFTP server (step S16).

The downloaded configuration file name information is updated to the nonvolatile memory 270 (step S17), and then, the registration process of the cable modem is performed (step S18).

Upon comparison, if the received configuration file version information is the same or earlier than the configuration file version information stored in the non-volatile memory 270, it is determined that the received configuration file version information is identical to the previously stored configuration file. Then, the previously downloaded configuration file is read from the non-volatile memory 270 and the registration process of the cable modem is performed (step S21).

As stated above, in case that the configuration file stored in the non-volatile memory 270 is used, the time required for downloading the configuration file in the process of initializing the cable modem can be reduced.

As so far described, the file downloading apparatus and method of a cable modem of the present invention has many advantages.

That is, for example, first, since the configuration file for initializing the cable modem is downloaded, there is no need to download the configuration file in the initializing process, so that the time required for initializing process can be shortened at the maximum.

Secondly, by encoding the version information to the configuration file, the configuration version information existing in the current TFTP server known even without downloading the configuration file. Thus, when initializing the cable modem, the configuration file is downloaded to update the non-volatile memory, only when a configuration file having a later version exists in the TFTP server. Therefore, the time required for downloading the configuration file may be minimized.

Lastly, since the version information of the configuration file can be displayed by re-constructing the boot file region of the DHCP message format which has been conventionally used, the existing device can be used as it is.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for initializing a cable modem comprising:

a tuner unit adapted to receive, tune and output a plurality of downstream signals received from a cable modem termination system and to receive, tune and output a plurality of upstream signals to the cable modem termination system;

a downstream unit adapted to demodulate the downstream signals from the tuner unit and separate general data from a media access control (MAC) management message;

a message processor adapted to detect name information and version information of a configuration file for initializing the cable modem and manufacturing automation protocol (MAP) information according to the MAC management message input from the downstream unit;

a CPU adapted to control the message processor; and an upstream unit adapted to generate and modulate the upstream signal according to the MAP information detected by the message processor, wherein the CPU compares the name information of the configuration file for initializing the cable modem to name information of a configuration file previously stored in a memory, downloads the configuration file for initializing the cable modem if the name information of the configuration file for initializing the cable modem and the name information of the previously stored configuration file are different, compares the version information of the configuration file for initializing the cable modem to version information of the previously stored configuration file only if the name information of the configuration file for initializing the cable modem is identical to the name information of the previously stored configuration file, downloads the configuration file for initializing the cable modem if the version information of the configuration file for initializing the cable modem is more recent than the version information of the previously stored configuration file, and reads the previously stored configuration file and initializes the cable modem based on the previously stored configuration file when the version information of the configuration file for initializing the cable modem is identical to the version information of the previously stored configuration file.

2. The apparatus of claim 1, wherein the general data of the downstream unit is transmitted to a display unit that can be viewed by a user through an MPEG 2 transport stream interface, and the MAC management message is transmitted to the message processor.

3. The apparatus of claim 1, wherein the message processor parses the format of information related to the detected configuration file into a configuration file name part and a configuration file version part with a delimiter part therebetween.

4. The apparatus of claim 3, wherein the format of the information related to the detected configuration file comprises a file name part indicating a configuration file name, a file version part indicating a configuration file version, and a delimiter part differentiating the file name part and the file version part.

5. A method for initializing a cable modem, the method comprising:

registering information related to a detected configuration file in a dynamic host configuration protocol (DHCP) server;

receiving the information related to the detected configuration file registered in the DHCP server;

comparing name information related to the detected configuration file with name information related to a previously stored configuration file;

downloading the detected configuration file if the name information related to the detected configuration file and the name information related to the previously stored configuration file are different;

comparing version information related to the detected configuration file with version information related to the previously stored configuration file only if the name information of the detected configuration file is identical to the name information related to the previously stored configuration file; and downloading the detected configuration file if the version information related to the detected configuration file is more recent than the version information related to the previously stored configuration file; and reading the previously stored configuration file, registering the cable modem using the previously stored configuration file and initializing the cable modem based on the previously stored configuration file when both the name information related to the detected configuration file is identical to the name information related to the previously stored configuration file and the version information related to the detected configuration file is identical to the version information related to the previously stored 6. The method of claim 5, wherein receiving the information related to the detected configuration file comprises:

parsing the configuration file information into a file name part and a file version part.

7. The method of claim 5, further comprising:

performing a registration process of the cable modem by using the previously stored configuration file if the version information of the detected configuration file is the same as the version information of the previously stored configuration file.

8. The method of claim 5, wherein the format of the information related to the detected configuration file and the previously stored configuration file comprise:

a file name part indicating a configuration file name;

a file version part indicating a configuration file version; and a delimiter part between the file name part and the file version part.

9. A method for initializing a cable modem, the method comprising:

constructing first configuration file information with a file name part, a file version part and a delimiter part, the delimiter part having a finite size such that the file name part and file version part border the delimiter part, and registering the configuration file information in a dynamic host configuration protocol (DHCP) server, the first configuration file information corresponding to a detected configuration file;

receiving the first configuration file information registered in the DHCP server;

parsing the first configuration file information into a file name part and a file version part;

reading second configuration file information corresponding to a previously stored configuration file;

comparing the file name part of the first configuration file information to a file name part of the second configuration file information;

downloading the detected configuration file if the file name part of the first configuration file information and the file name part of the second configuration file information are different;

comparing the file version part of the first configuration file information to a file version part of the second configuration file information only if the file name part of the first configuration file information is identical to the file name part of the second configuration file information;

downloading the detected configuration file if the file version part of the first configuration file information is more recent than the file version part of the second configuration file information and reading the previously stored configuration file if the file version part of the first configuration file information is one of older than and the same as the file version part of the second configuration file information; and performing a registration process using one of the detected configuration file and the previously stored configuration file according to the comparison result.

10. The method of claim 9, wherein if the detected configuration file is an initialization file that is first input to the cable modem, the first configuration file is stored in the memory and the registration process is performed using the first configuration file information.

* * * * *